United States Patent [19]

Yoshimura et al.

[11] Patent Number: 5,111,056
[45] Date of Patent: May 5, 1992

[54] OPTICAL MEASUREMENT SYSTEM DETERMINATION OF AN OBJECT PROFILE

[75] Inventors: Kazunari Yoshimura, Hirakata; Kuninori Nakamura, Neyagawa, both of Japan

[73] Assignee: Matsushita Electric Works, Ltd., Osaka, Japan

[21] Appl. No.: 684,121

[22] Filed: Apr. 12, 1991

[30] Foreign Application Priority Data

Apr. 14, 1990 [JP] Japan .................... 2-98722
Dec. 25, 1990 [JP] Japan .................... 2-405527

[51] Int. Cl.$^5$ .................................. G01N 21/86
[52] U.S. Cl. .................................. 250/560; 356/376
[58] Field of Search ............... 250/234–236, 250/560; 356/373, 375, 376, 384, 387

[56] References Cited

U.S. PATENT DOCUMENTS

| | | | |
|---|---|---|---|
| 3,866,038 | 2/1975 | Korth | 250/236 |
| 3,986,774 | 10/1976 | Lowrey, Jr. et al. | 356/376 |
| 4,171,917 | 10/1979 | Pirlet | 356/376 |
| 4,373,804 | 2/1983 | Pryor et al. | 356/376 |
| 4,627,734 | 12/1986 | Rioux | 356/376 |

*Primary Examiner*—David C. Nelms
*Assistant Examiner*—S. Allen
*Attorney, Agent, or Firm*—Armstrong, Nikaido, Marmelstein, Kubovcik and Murray

[57] ABSTRACT

An optical measurement system for determination of an object profile includes a light source for emitting a light beam, light directing means for directing the light beam to scan a surface of the object surface and for directing a reflected light beam from the object surface in a direction angled from that of the light beam incident to the surface. The reflected light beam is received at position detecting means to provide position data with respect to the individual scanned points on the object surface. The position data is analyzed to measure a series of distances to the individual scanned points on the object surface to obtain from the measured distances height data of the individual scanned points and to determine an object profile along the scanned point on the object surface. The light directing means comprises a single deflector which deflects the light beam onto the object for scanning the object surface thereby, a first projecting lens interposed between the deflector and the object to project the light beam on the object surface, and a second receiving lens offset from the first projecting lens and interposed between the object surface and the common deflector to converge the reflected beam from the object surface on the light receiving elements. The deflector is in the form of a planar vibration mirror upon which the light beam from the light source and the reflected light beam from the object surface are incident.

6 Claims, 8 Drawing Sheets

5,111,056

OPTICAL MEASUREMENT SYSTEM DETERMINATION OF AN OBJECT PROFILE

BACKGROUND OF THE INVENTION

1. Field of the Invention

The present invention is directed to an optical measurement system for determination of an object profile, and more particularly to a system which scans an object surface by a light beam and analyzes the reflected light beam therefrom in order to determine the object profile based upon position data of scanned points on the object surface.

2. Description of the Prior Art

An optical measurement system for determination of an object profile based upon the position data on the object surface has been proposed, for example, to check mounting conditions of electronic components on a printed board or soldering condition thereof. Such optical measurement is disclosed in the U.S. patent application Ser. No. 463,579 filed on Jan. 11, 1990 by the same applicant. As shown in FIG. 7 of the attached drawings, the above prior art system utilizes a laser beam I which is emitted from a light source 1 and directed toward a surface of an object 9 through a projecting lens 3 to provide a beam spot on the object surface. The light beam I is deflected by a first vibration mirror 2a to move the beam spots across the object surface for scanning the object surface. A position detector 8 is disposed to monitors a reflected light beam R reflected from the object surface in a direction angled from the incident light beam I and directed through a receiving lens 4. A second vibration mirror 2b is positioned between the receiving lens 4 and the detector 8 and is vibrated in synchronism with the first mirror 2a to direct the reflected light beam R to the detector 8. During the scanning operation, the detector 8 acknowledges a change in an incidence of angle of the reflected light beam R and produces a position signal indicative of the varying angle of incidence of the reflected light beam R. The position signal is processed to measure instantaneous distances to individual scan points on the object surface by triangulation. Thus obtained measured distances are related to individual height dimensions of the scanned points and are analyzed to provide a profile of the object surface along the scanned points. Disposed between the light source 1 and the first vibration mirror 2a are a collimator 5 and mirrors 6 and 7.

With this system, it is known that, as shown in FIG. 8, two spaced points A and B at the same height level on the object surface are detected at the same point A' on the detector 8. However, if the first and second vibration mirrors 2a and 2b fail to synchronize even at a slight extent, the above two points A and B on the object surface are detected on the detector 8 not at the common point A' but respectively at points A' and B' which are offset along x-direction by a distance of Δx. Since the detector 8 acknowledges the displacement of the reflected beam spot in the z-direction as a change in an incidence of angle of the reflected light beam R for the triangulation, the above deviation Δx will not affect the result of the triangulation. Nevertheless, in order to compensate for the deviation Δx and keep detection reliability, the detector 8 is required to have its sensing surface widened in the x-direction enough to encompass the deviation Δx. Accordingly, when the detector is designed in the form of an array sensor, extra sensor arrays are required to be arranged to cover an increased width W in the x-direction with attendant increase in economy and complication of the system.

In the meanwhile, when checking the soldering condition by scanning the light beam across the surface of a solder 90, as shown in FIG. 9, a secondary reflected light beam R' is likely to occur due to lucid surface of the solder, in addition to the intended reflected beam R from the solder surface. Such secondary reflected light beam R' will mislead the detection at the detector 8 and therefore give false height data and should be prevented from entering the detector 8 for an accurate measurement purpose. However, when the detector 8 is required to have a widened sensor surface or more number of sensor arrays for the reason as above, the result is an increased probability of the secondary reflected light beam R' entering the detector to thereby lower the measurement accuracy.

In an attempt to avoid the above problems, it has been proposed in U.S. Pat. No. 4,627,734 to use a single deflector commonly for projecting the light beam toward the object surface as well as for receiving the reflected light beam therefrom. The deflector of this patent is a pyramidal or polygonal mirror having several facets or faces which are separately utilized to project the light beam toward the object surface and receive the reflected light beam therefrom. Therefore, there still remain like deviation of the detected points on the side of the detector due to possible variation in planar condition or accuracy between the plural facets or faces.

Another prior optical measurement system is disclosed in U.S. Pat. No. 3,866,038 which utilizes a polygonal mirror having plural faces for projecting light beam toward the object surface and receiving the reflected light therefrom on the common face. With this system, therefore, the above problem can be eliminated. However, there is another problem in this patent due to the configuration that a single lens is disposed between the deflector and the object surface for directing therethrough the light beam toward the object surface and the reflected light beam therefrom. In view of that the common lens is required to focus the light beam to the object surface and that the reflected light beam travels substantially the same distance from the object surface to the common lens as the light beam does from the common lens to the object surface, the reflected light beam from the object surface will be directed to the deflector as parallel light beams after passing through the common lens, which necessitates an extra convergent lens between the deflector and the detector in order to have the reflected beam focused on the sensing surface of the detector, which complicates the optical configuration of the system. Further, due to use of the single lens commonly for directing the deflected light beam to the object and directing the reflected light beam to the deflector, the light beam being deflected is restricted to pass through a peripheral region of the lens and therefore is susceptible to spherical aberration and is difficult to attain wide scan width on the object surface. In addition, the optical system of this patent will incur an undesirable interference between the light beam directed toward the object surface and the reflected beam therefrom since diffused lights produced on or within the lens as the light beam is directed through the lens to the object surface have more chance of intruding into a receiving light path of directing the reflected light beam toward the deflector, which lowers an S/N ratio with an attendant decrease in detection accuracy.

SUMMARY OF THE INVENTION

The above problems have been eliminated in the present invention which provides an improved optical measurement system for determination of an object profile. The system utilizes a light source for emitting a light beam, a light directing means for directing the light beam to scan the object surface and for directing a reflected light beam from the object surface in a direction angled from that of the light beam incident to the object surface. A position detecting means with a sensor surface is disposed to receive the reflected light beam at the sensor surface so as to obtain position data with respect to the individual scanned points on the object surface. The position data is analyzed at an analyzing means to measure a series of distances to the individual scanned points on the object surface, which measured distances represents height data of the individual scanned points and determine an object profile along the scanned point. The light directing means comprises a single deflector which deflects the light beam towards the object surface for scanning thereof, a first projecting lens interposed between the deflector to project the light beam to make a beam spot on the object surface, and a second receiving lens which is offset from the first projecting lens between the object surface and the deflector to cover the reflected light beam from the object surface toward the position detecting means. The second receiving lens is selected and positioned to give a sharp image of the beam spot on the object surface onto the sensor surface of the position detecting means with a desired magnification of image. With the use of a single deflector for projecting the light beam toward the object surface and the receiving the reflected light beam therefrom, no synchronization is required between the deflection of these projected and reflected light beams, thus eliminating unacceptable detection errors and therefore assuring accurate measurement with the use of a simple sensor configuration. Besides, since the second receiving lens is arranged between the object surface and the deflector to converge or focus the reflected light beam from the object surface for producing a sharp image of the beam spot on the object surface onto the sensor surface of the position detecting means, no additional focusing lens is necessary to obtain the image of the beam spot, which simplifies the optical arrangement of the system. Further, due to the offset positioning of the second receiving lens from the first projecting lens it is readily possible to have the individual light beams passing respectively through center portions of the first and second lenses adjacent the individual optical axes thereof, thereby minimizing the spherical aberration to assure accurate measurement.

Accordingly, it is a primary object of the present invention to provide an improved optical measurement system which is capable of achieving accurate measurement, yet simplifying the optical arrangement.

The deflector is provided as a vibration planar mirror which vibrates about a vibration axis to deflect the projecting light beam for scanning the object surface thereby and also the reflected light beam for compensation of the projecting light beam deflection. The projecting light beam and the reflected light beams are deflected on the same plane mirror surface to thereby eliminate undesirable distortion between the projecting and receiving light beams. The vibration axis is perpendicular to a light projecting plane in which the light beam is deflected toward the object surface and also to a light receiving plane including a principal axis of the reflected light beams incident to the deflector. One or more mirrors are interposed between the second receiving lens and the deflector to have a reflected beam path which extends therebetween by a distance which is equal to a focal length of the second receiving lens. With the provision of the mirrors, the second receiving lens can be offset sufficiently from the first projecting lens while using the common deflector, enabling it to utilize the center portions of the individual lens as well as to have a desired magnification of image at the sensor surface of the position detector means, which is therefore another object of the present invention.

In a preferred embodiment, a screen is provided between the deflector and the first projecting lens in order to prevent possible diffused lights reflected on the surface of the first projecting lens from going into the reflected light beam directed towards the position detecting means.

It is therefore a further object of the present invention to provide an improved optical measurement system which is capable of successfully isolating the reflected light beam from the projecting light beam for reliable measurement while using the common deflector for the projecting and the receiving light beams.

In another embodiment, the first projecting lens and said second receiving lens are integrally joined at their respective peripheries to have individual optical center portions sufficiently spaced from each other, enabling to simplify the optical arrangement, which is therefore a still further object of the present invention.

These and still other objects and advantages will become more apparent in the following description of the preferred embodiments when taken in conjunction with the attached drawings.

DETAILED DESCRIPTION OF PREFERRED EMBODIMENTS

Figure 1:
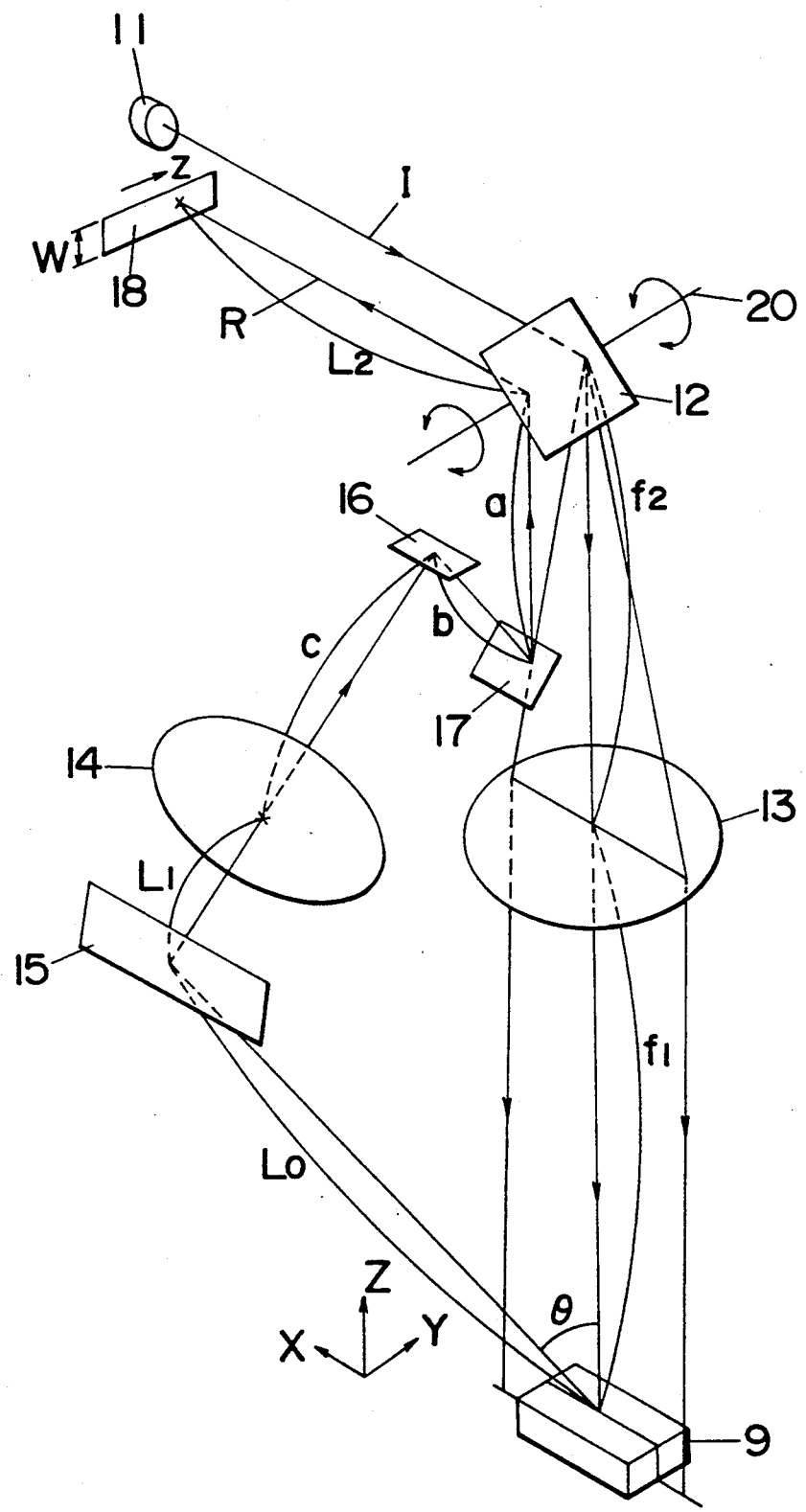
FIG. 1 is a schematic view illustrating an optical measurement system in accordance with a first embodiment of the present invention.

Referring now to FIG. 1, there is illustrated an optical measurement system for determination of an object profile in accordance with a first embodiment of the present invention. The system utilizes a light beam I directed to a surface of an object 9 for scanning the object surface and a position detector with a photosensitive element 18, for example, composed of an array sensor for monitoring a reflected light beam R from the object surface. During the scanning operation of moving the light beam I across the object surface, the detector acknowledges a change in an incidence of angle of the reflected light beam R as a corresponding position change in light receiving spots of the photosensitive element or array sensor 18 in the z-direction of the figure. Upon receiving the reflected light beam R, the detector will produces a position signal indicative of the varying angle of incidence of the reflected light beam R. The position signal is processed to measure instantaneous distances to individual scan points on the object surface by triangulation, which distances are therefore related to individual height dimensions of the scanned points from a reference horizontal plane which is generally perpendicular to a plane including the light beam I directed to the object 9. Thus measured distances are then analyzed in a suitable circuitry to provide a profile of the object surface along the scanned points.

The system comprises a light source 11 emitting a laser beam as the light beam and a deflector 12 in the form of a vibration mirror which vibrates about a vibration axis 20 perpendicular to the light beam from the light source 11 for deflecting the light beam within a limited angle to scan the surface of the object along the x-direction as indicated in the figure. A projecting lens 13 is interposed between the deflector 12 and the object 9 to converge the light beam I to have a corresponding beam spot on the object surface. A monitoring mirror 15 is located upwardly in a horizontally displaced position to receive the reflected light beam R at an angle of $\Theta$ from the light beam I incident to the object surface. The reflected light beam R is then directed through a receiving lens 14, mirrors 16 and 17, and the common deflector 12 to impinge onto the array sensor 18. The receiving lens 14 acts to converge the reflected light beams R so as to produce a sharp image of the beam spot on the object surface onto the array sensors 18, while the deflector 12 compensates for the projecting light beam deflection so as to focus the reflected light beam onto the array sensor 18. The projecting lens 13 is disposed between the deflector 12 and the object 9 in such a position that the deflector 12 and the object surface corresponding respectively to object and image focal points thereof, thereby minimizing the beam spot as well as successfully effecting the scanning of the object surface by the vibration of the deflector 12. The mirrors 16 and 17 are so disposed as to direct the reflected light beam R to the deflector 12 substantially in a plane perpendicular to the vibration axis 20 such that the light beams I and R to and from the deflector 12 are directed in planes parallel to each other, eliminating the interference therebetween notwithstanding the common use of the deflector 12.

The receiving lens 14 is selected to have an image focal length f2' equal to an object focal length f2 of the projecting lens 13, and is arranged to satisfy the following equation:

$$\frac{f_1'}{La} + \frac{f_2'}{Lb} = 1 \qquad \text{(i)}$$

wherein f1' is an object focal length of the receiving lens 14, La is a sum of a distance L0 between the object surface and the monitoring mirror 15 and a distance between the monitoring mirror 15 and the receiving lens 14 (La=L0+L1), and Lb is a sum of distances L2, a, b, and c respectively between the array sensor 18 and the deflector 12, between the deflector 12 and the mirror 16, between the mirrors 16 and 17, and between the mirror 17 and the receiving lens 14 (Lb=L2+a+b+c), as shown in FIG. 1.

Figure 2:
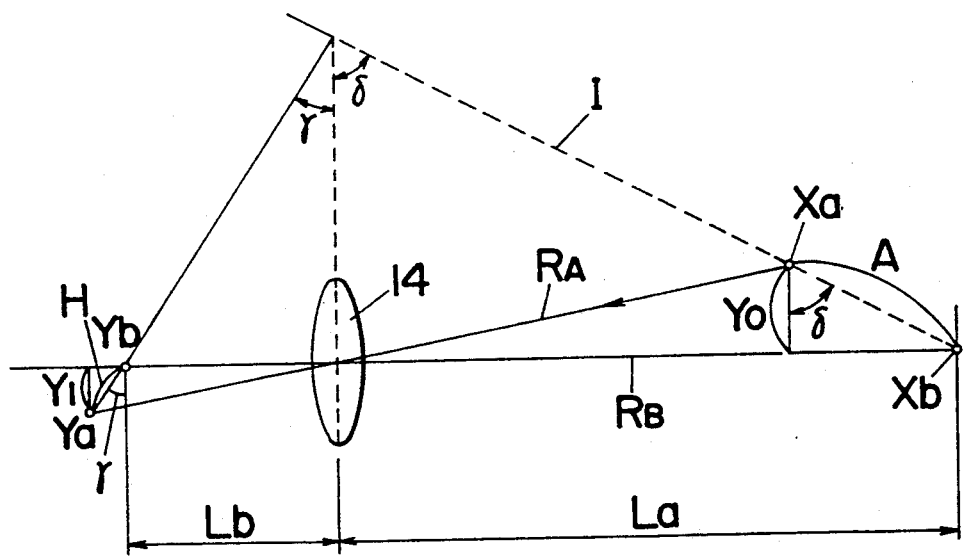
FIG. 2 is a diagram illustrating the Scheimpflug condition to be satisfied in an optical arrangement of the above system.

Further, the optical system is also arranged to satisfy the Scheimpflug condition to have a desired magnification of image at the array sensor 18. That is, as shown in FIG. 2, when an object Xa-Xb is focused through the lens 14 to have an image Ya-Yb, the following equations can be made.

$$Y_0 = A\cos\gamma \qquad \text{(ii)}$$
$$Y_1 = MY_0 = MA\cos\delta \qquad \text{(iii)}$$
$$H = \frac{Y_1}{\cos\gamma} \qquad \text{(iv)}$$
$$\tan\gamma = M\tan\delta \qquad \text{(v)}$$

wherein M is magnification of image, A is an minimum detectable displacement of the object (object resolution), and H is a length of one pixel of the sensor array (detection resolution).

From the equations (ii) to (v), M is obtained as follows:

$$M = \sqrt{\frac{-A\cos^2\delta + \sqrt{A^4\cos^4\delta - 4H^2A^2\sin^2\delta}}{2A^2\sin^2\delta}}$$

In other words, the receiving lens 14 is disposed so that the ratio of the distance Lb (=L2+a+b+c) between the lens 14 and the array sensor 18 to La (=L1+L0) between the lens 14 and the object 9 is set to equal the magnification of image M.

As seen in FIG. 1, the optical system of the present invention uses a single deflector 12 with one planar mirror which are utilized commonly to project the light beam towards the object and to receive the reflected light beam therefrom. With this consequence, during the scanning of the object surface by moving the light beam spot along the x-direction, the image of the beam spot on the array sensor 18 will not be influenced or fluctuated by such movement of the beam spot but displaced in response to the beam spot moving in the z-direction, thereby enabling to measure height variance of the object surface by the displacement of the image on the array sensor 18 in the z-direction. It is noted in this connection that the optical system can also be used as a linear image sensor with bright level detecting capability when measuring the brightness of the image. In addition, since the projecting lens 13 and the receiving lens 14 are separately utilized to converge the light beam toward the object 9 and to converge the reflected light beam therefrom, the center portion including an optical axis of each lens can be best utilized for projecting and receiving the light beams, whereby minimizing the undesirable aberration and increasing measurement accuracy.

Figure 3:
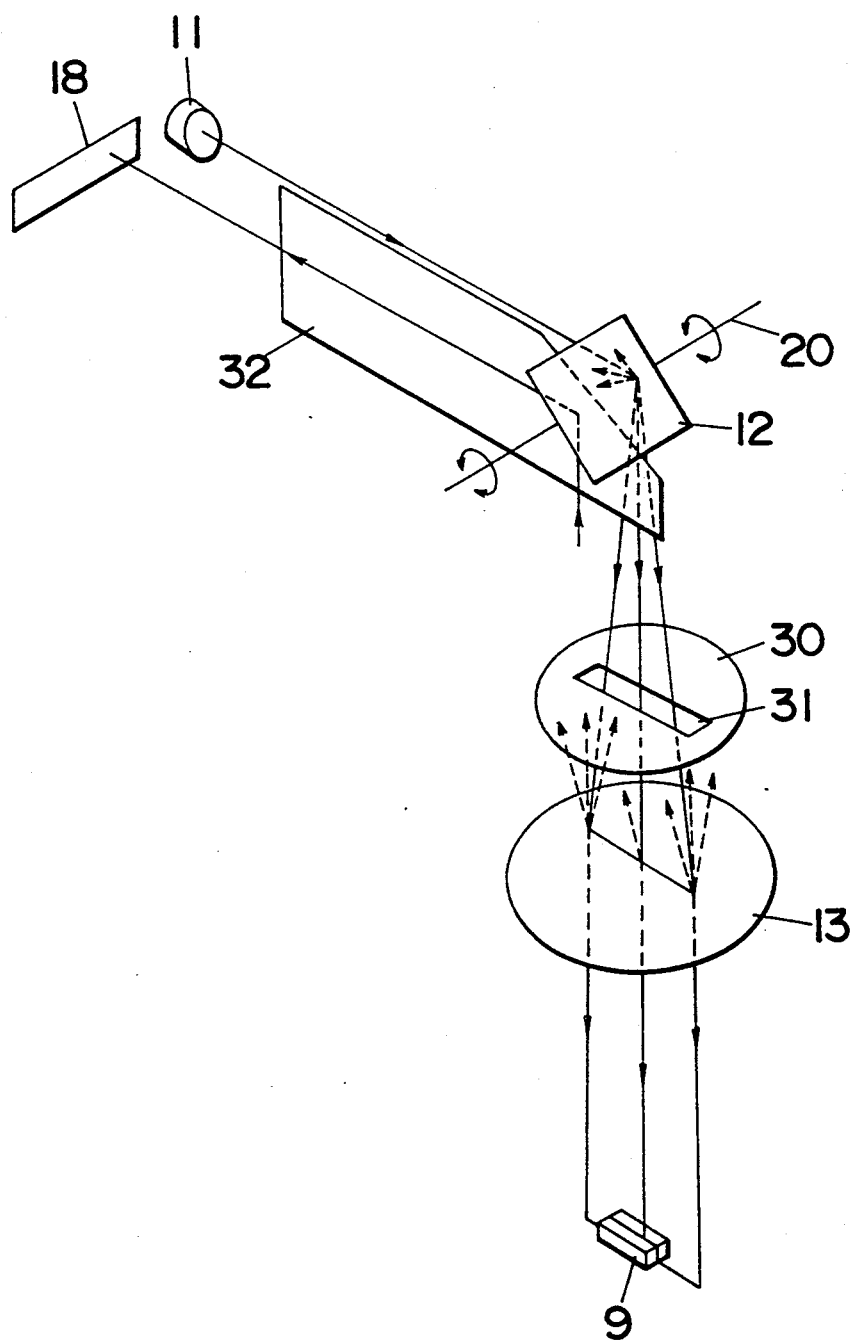
FIG. 3 is a schematic view illustrating a modification of the above embodiment.

FIG. 3 illustrates a modified optical system which is identical in structure to the above embodiment except that a screen 30 with a slit 31 is interposed between the deflector 12 and the projecting lens 13. Therefore, like parts are designated like numerals as in the above embodiment. The slit 31 is elongated in the deflecting direction so as to allow only effective light beams to be directed to the projecting lens 13 and to prevent diffusing lights reflected on the lens 13 from being directed back to the deflector 12 which would otherwise intrude the reflected light beam being directed to the deflector 12, thus keeping the reflected light beam harmless from the diffusing lights to increase measurement reliability. In addition, a shutter 32 is provided to separate a receiving path of directing the reflected light beam to the array sensor 18 from the deflector 12 from a projecting path of directing the light beam to the deflector 12 from the light source 11. To this end, the shutter 32 is positioned to have its plane in perpendicular relation to the vibration axis 20 of the deflector 12, as shown in FIG. 3.

Figure 4:
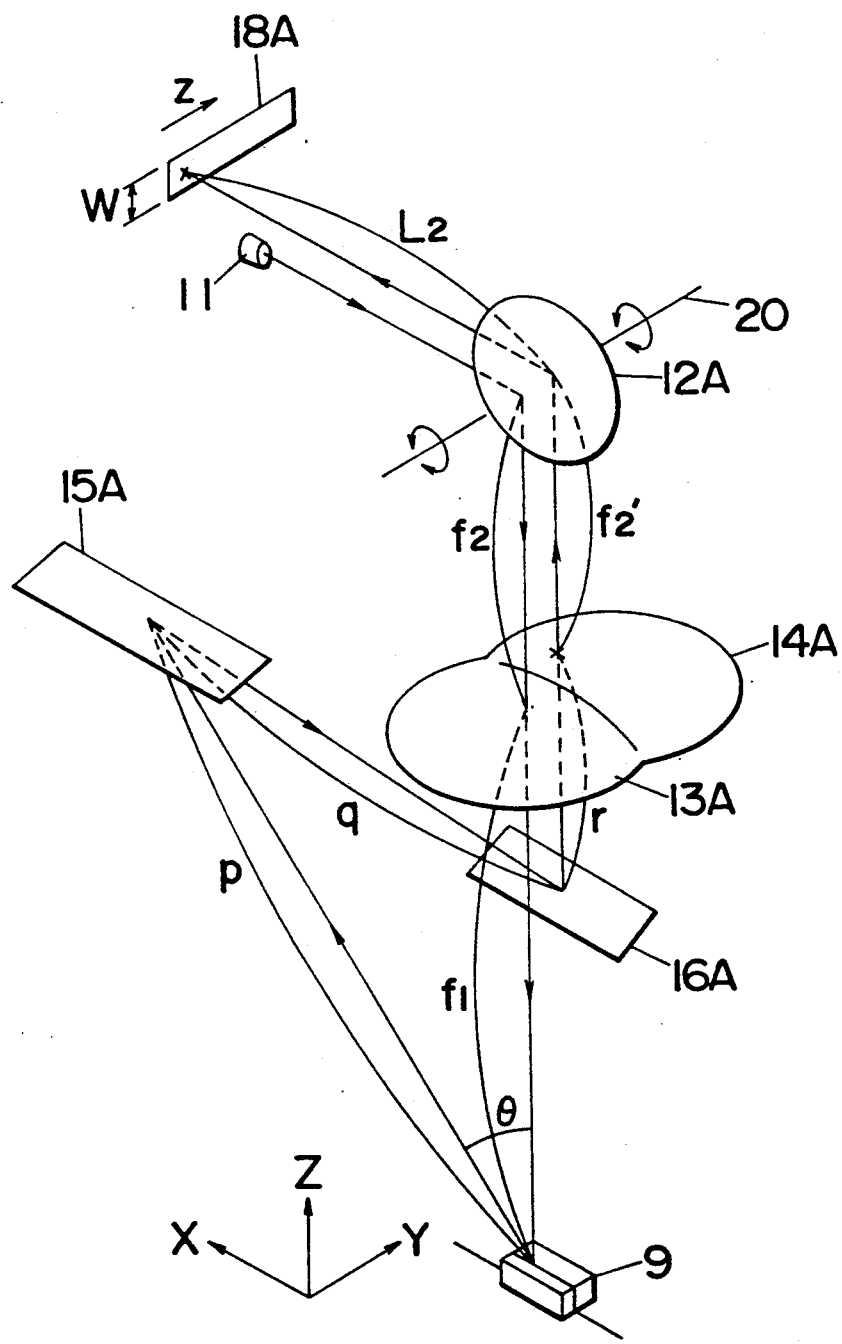
FIG. 4 is a schematic view illustrating another optical measurement system in accordance with a second embodiment of the present invention.

FIG. 4 illustrates a second embodiment of the present invention which is identical to the above first embodiment except that a projecting lens 13A and a receiving lens 14A are formed integrally into a unitary structure. Like parts are designated by like numerals with a suffix letter of "A" for an easy reference purpose. The combination lens may be constructed by cutting the separate lenses 13A and 14A in their peripheral portions to have respective straight peripheral edges and abutting the resulting straight edges to each other while spacing the central portions of the lenses spaced by a distance enough to direct the light beam toward the object and the reflected light therefrom independently to each other. Alternately, the combination lens may be integrally molded or formed into a non-spherical configuration having two lens 13A and 14A with respective optical axes parallel to each other. With the use of the combination lens, it is possible to reduce the number of the mirrors 15A and 16A in the receiving light path, as compared to the first embodiment, while arranging to receive the reflected light from the object surface at an angle of Θ from the light beam incident to the object surface, as shown in FIG. 4. It is noted at this point that the light beam is deflected by the vibration mirror 12A within a plane including the optical axis of the projecting lens 13A and that the reflected light beam is incident to the vibration mirror 12A within another parallel plane including the optical axis of the receiving lens 14A in the like manner as in the first embodiment. In the present embodiment, the optical system is arranged to satisfy the following equation:

$$\frac{f_1'}{(p+q+r)} + \frac{f_2'}{(L_2+f_2')} = 1$$

wherein $f_1'$ and $f_2'$ are respectively object focal length and image focal length of the receiving lens 14A, p, q, and r are distances between the object surface and the monitoring mirror 15A, between the mirror 15A and mirror 16A, and between the mirror 16A and the lens 14A, respectively and L2 is a distance between the deflector 12A and the array sensor 18A. The mirrors 15A and 16A are positioned relative to the lens 14A so as to give a magnification of image M at the sensor array 18A.

Figure 5:
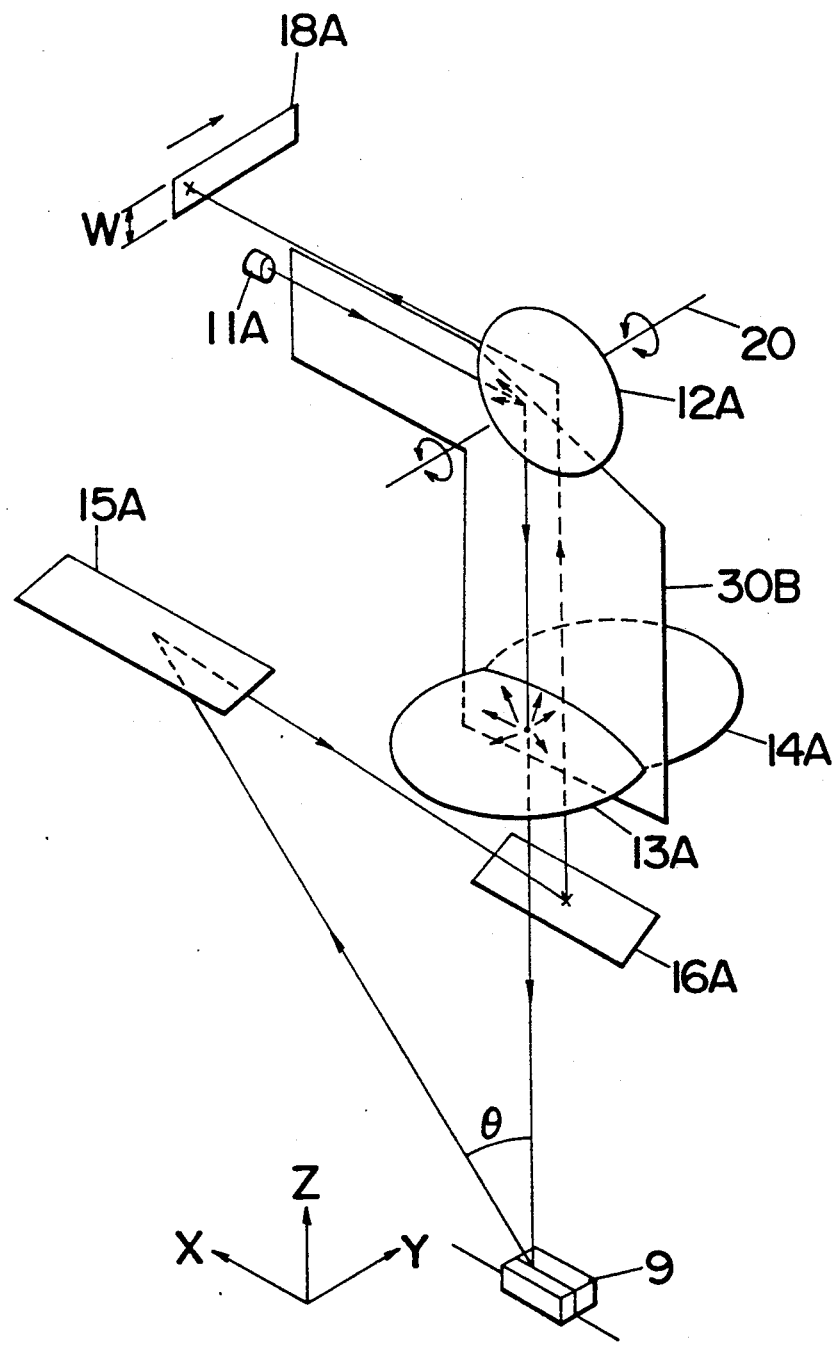
FIGS. 5 and 6 are schematic views illustrating modifications of the second embodiment.

FIG. 5 illustrates a modification of the above second embodiment which is identical thereto except for a screen 30B. Like parts are designated by like numerals as in the second embodiment. The screen 30B is provided to extend from adjacent the light source 11A to the combination lens 13A and 14B in order to separate the light projecting plane and the light receiving plane, thus preventing the diffused lights occurring from the projecting lens 13A from invading the reflected light beam towards the deflector 12A.

Figure 6:
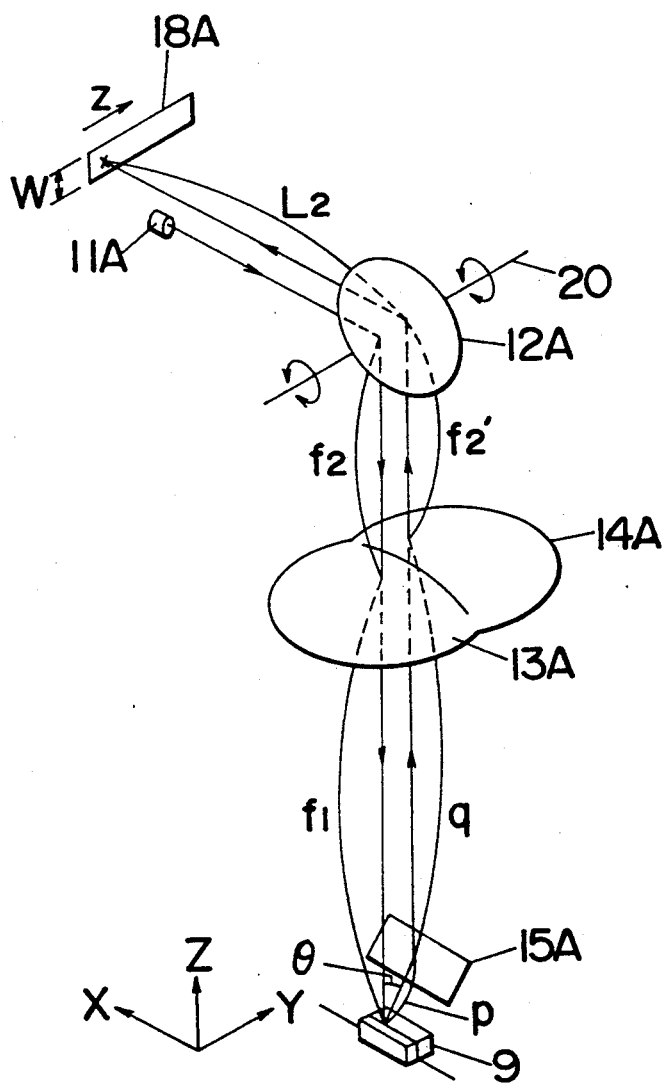
Figure 7:
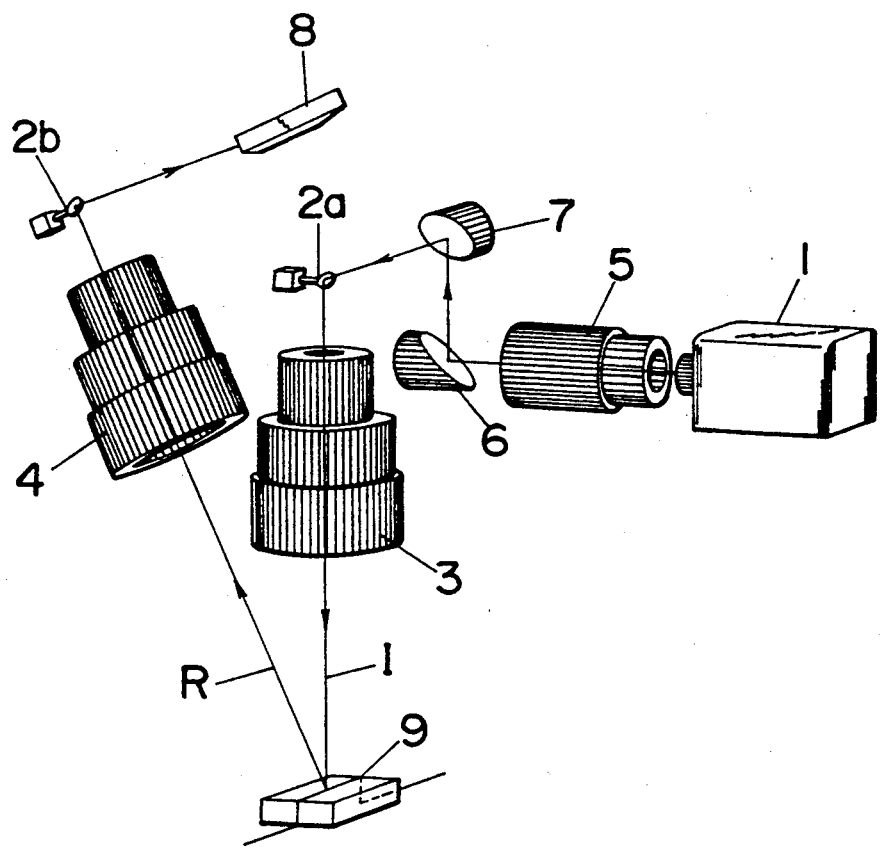
FIG. 7 is a schematic view illustrating a prior optical measurement system.
Figure 8:
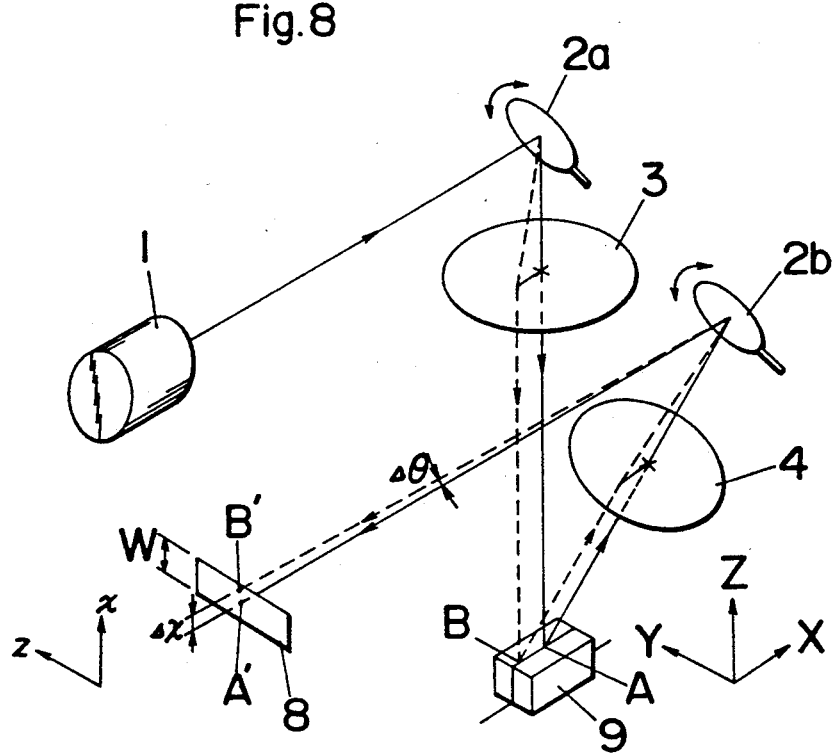
FIGS. 8 and 9 are respectively schematic views illustrating problems of the prior optical measurement system.
Figure 9:
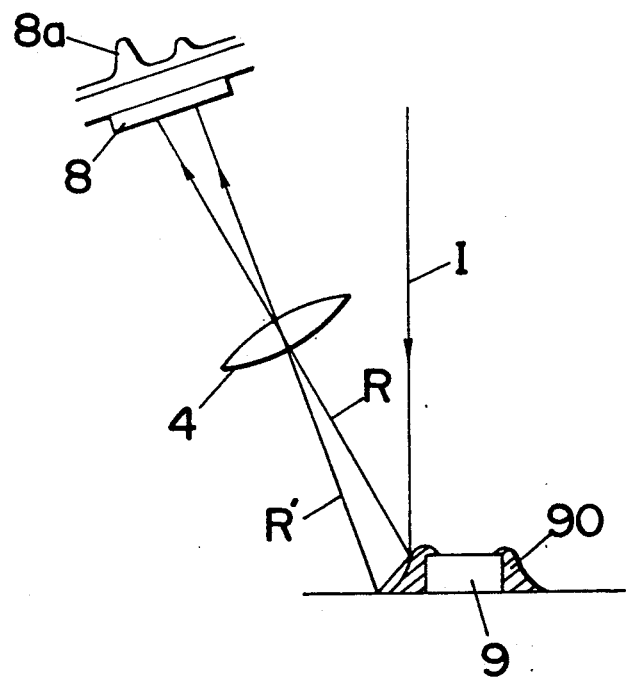

FIG. 6 illustrates another modification of the second embodiment in which only a monitoring mirror 15A is utilized in addition to the deflector 12A and the combination lens 13A and 14A in the optical system. In this modification, the object focal length f2 of the projecting lens 13A is equal to the image focal length f2' of the receiving lens 14A (f2=f2'), while the object focal length f1' of the receiving lens 14A is not equal to the image focal length f1 of the projecting lens 13A (f1'≠f1), and the optical elements are disposed in such a relation as to satisfy the following equation:

$$\frac{f_1'}{(p+q)} + \frac{f_2'}{(L_2+f_2')} = 1$$

wherein p and q are distances between the object surface and the monitoring mirror 15A and between the mirror 15A and the receiving lens 14A, respectively, and L2 is a distance between the deflector 12A and the array sensor 18A.

What is claimed is:

1. In an optical measurement method for determination of an object profile comprising the steps of:
   a) directing light beam to scan a surface of an object surface and to obtain a reflected light beam therefrom in a direction angled from that of said light beam incident to said object surface;
   b) receiving said reflected light beam to obtain position data with respect to the individual scanned points on the object surface; and
   c) analyzing said position data to measure a series of distances to the individual scanned points on the object surface, said measured distances representing height data of said individual scanned points being processed to determine an object profile along said scanned point;

an improvement is characterized that said step a) further comprising the sub-steps of:
   deflecting said light beam toward said object surface by the use of a deflector and directing it through an optical center portion of a lens onto said object surface to providing a series of corresponding beam spots across said object surface for scanning said object surface thereby;
   converging said reflected light beam from said object surface and deflecting it by the common deflector to direct a resulting deflected light beam for providing said position data.

2. In an optical measurement system for determination of an object profile comprising:
   a light source for emitting a light beam;
   light directing means for directing said light beam to scan a surface of said object surface and for directing a reflected light beam from said object surface in a direction angled from that of said light beam incident to said object surface;
   position detecting means with a sensor surface disposed to receive said reflected light beam at said sensor surface so as to obtain position data with respect to the individual scanned points on the object surface; and
   analyzing means which analyzes said position data to measure a series of distances to the individual scanned points on the object surface, said measured distances representing height data of said individual scanned points being processed to determine an object profile along said scanned point;

said light directing means further comprising:

a single deflector which deflects said light beam towards said object so as to scan said object surface;

a first projecting lens interposed between said deflector and said object to project said deflected light beam to have a series of beam spots on said object surface along a scanning direction, said first projecting lens having an optical axis on which said delectd light beam is centered so as to pass through an optical center portion of said first projecting lens;

a second receiving lens offset from said first projecting lens and interposed between said object and said common deflector to converge said reflected beam from said object surface on the sensor surface of said position detecting means, said second receiving lens being selected and positioned to give a sharp image of the beam spot on the object surface onto the sensor surface of said position detecting means with a desired magnification of image, said second projecting lens having an optical axis on which said reflected light beam is centered so as to pass through an optical center portion of said second receiving lens to said common deflector.

3. An optical measurement system as set forth in claim 2, wherein said deflector comprises a vibration planar mirror vibrating about a vibration axis for deflection of said light beam from said light source as well as said reflected light from said object surface, said vibration axis being perpendicular to a light projecting plane in which said light beam is deflected toward the object surface and also to a light receiving plane including a principal axis of the reflected light beams incident to said deflector, said system further including one or more mirrors interposed between said second receiving lens and said deflector to have a reflected beam path extending therebetween by a distance which is equal to a focal length of said second receiving lens.

4. An optical measurement system as set forth in claim 2, wherein a screen is provided between said deflector and said first projecting lens in order to prevent possible scattering lights reflected on the surface of said first projecting lens from going into said reflected light beam to said position detecting means.

5. An optical measurement system as set forth in claim 2, said first projecting lens and said second receiving lens are integrally joined at their respective peripheries to have individual optical center portions sufficiently spaced from each other.

6. An optical measurement system as set forth in claim 2 or 5, wherein said first projecting lens and said second receiving lens have the same focal length, and wherein a mirror is interposed between said object surface and said second receiving lens to have said reflected light beam from said object surface angled from said light beam incident to said object surface.

* * * * *